Nov. 5, 1968 F. KÖNIG ET AL 3,409,837

AMPLIFIER NETWORK

Filed Feb. 1, 1965 2 Sheets-Sheet 1

Fritz König
Roland Kuhnert

INVENTORS

BY

Darbo, Robertson & Vandenburgh

Nov. 5, 1968 F. KÖNIG ET AL 3,409,837

AMPLIFIER NETWORK

Filed Feb. 1, 1965 2 Sheets-Sheet 2

Fritz König
Roland Kuhnert

INVENTOR.

BY
Darbo, Robertson & Vandenburgh

United States Patent Office 3,409,837
Patented Nov. 5, 1968

3,409,837
AMPLIFIER NETWORK

Fritz König, Wuppertal-Barmen, and Roland Kuhnert, Dusseldorf-Nord, Germany, assignors to Losenhausenwerk Dusseldorfer Maschinenbau A.G., Dusseldorf, Germany Filed Feb. 1, 1965, Ser. No. 429,331
7 Claims. (Cl. 328—162)

ABSTRACT OF THE DISCLOSURE

An amplifier for a high internal impedance pickup has a voltage divider between the grid of the first tube and the output of the second tube to obtain a positive voltage feedback to the grid. From the tap of the voltage divider a negative voltage feedback connection is made to the emitter of the first tube, with the negative voltage feedback being at least as great as the positive feedback.

The present invention relates to an amplifier arrangement for use with electric measuring value pickups having a high internal impedance.

Measuring value pickups or transducers are, for instance, force responsive pickups consisting of thin disks of a piezoelectric solid body (crystal, lithium-hydrate-sulphate or barium-titanate-ceramics). They are utilized in accelerometers or with balancing machines for the determination of the unbalance forces in the bearing planes of the unbalance body. Pickups of this type have a high and substantially capacititive internal impedance. As a result thereof, the pickups may only be loaded with a substantially higher terminal resistance, otherwise, there will be a significant component of the electromotive force lost in the internal impedance.

The fact that the internal impedance is capacitive, involves the further drawback that such measuring value pickups perform differently as to their loadability with different frequencies of the signal voltage. For high frequencies the internal impedance is relatively small while for very low frequencies it becomes extremely high. Therefore, with the same input force, the apparent power of the pickup will be relatively small with low frequencies as compared to what it is with high frequencies. This phenomenon is highly undesired in balancing machines as it results in the fact that the interfering forces of higher frequency, caused for example by ball bearings, when the pickup is used with a resistance of too low a value, will be much more strongly noticeable in the signal voltage than the unbalance forces to be measured. This frequently requires a considerable network for filtering out from the signal those components of the undesired frequencies from the components of the desired frequencies.

An attempt has been made to avoid these difficulties by connecting to the measuring value pickup an amplifier with an electrometer tube as input stage. By suitable adjustment of the operating point of this electrometer tube, a relatively large load may be maintained on the pickup. However, this adjustment is sensitive and not easy to find. It requires a complex network for voltage and temperature stabilization, in the absence of which there will be a drift of the control grid current which makes a constant control and readjustment of this amplifier stage necessary. When connecting piezoelectric pickups a further difficulty that is encountered is that there will be voltage changes resulting from pyroelectric effect. Even temperature changes of fractions of a degree produce voltage changes up to a magnitude of a few volts across a high terminal resistance. Such a voltage change shifts the operating point of the electrometer tube out of the range of absence of current of the control grid thereof.

An amplifier network with positive and negative feedbacks is known wherein a current is produced by the positive feedback and/or the negative feedback through the pickup, which current is applied to in opposition to the original pickup current through the amplifier input resistance. In such networks the negative feedback is proportioned so that the difference of the control effect of the positive and negative feedbacks as related to the amplifier input is equal to or slightly smaller than one. Such a network is described in the German patent specification 910,427.

In this known network an amplifier is provided having a separate output for each of the two polarities of the signal to be amplified. One output is in phase with the input signal and the second output is in phase opposition thereto. This renders the amplifier more complicated. Furthermore, since one input terminal is connected to the output which is in phase opposition, no unsymmetrical signal voltages, that is such being one-sidedly applied to mass (ground), can be amplified. For, thereby, the amplifier output being in phase opposition to the signal voltage would be short-circuited. Furthermore, in the known network, the input and output terminals of the amplifier are on same potentials so that the voltage amplification may only become one. Also, a capacitive pickup impedance makes itself noticeable by a phase shift between the voltage dropping across the internal impedance of the pickup by the positive feedback with respect to the output voltage of the amplifier. Therefore, with pickups with capacitive internal impedance no compensation of the current fed by the pickup over the input resistance of the amplifier is possible at all.

It is the object of this invention to provide an amplifier which will overcome the foregoing problems.

In the present invention a positive feedback is effected by a positive feedback voltage to the grid of the input tube, which voltage is obtained from the signal voltage amplified in phase by means of a voltage divider, and the negative feedback is effected by a negative feedback voltage to the cathode and/or grid leak resistor of the input tube, which negative feedback voltage is obtained from the signal voltage amplified in phase by means of a further voltage divided. By using an amplified voltage, in phase with the input signal, to provide both the positive and negative feedbacks, unsymmetrical, as well as symmetrical, voltages can be amplified. This is of particular significance for high resistance force-measuring pickups such as are used with balancing machines. By picking off the feedback voltages at voltage dividers gains greater than unity may be obtained.

In the network in accordance with the invention the currents for the input of the amplifier, viz. the grid current of the input tube, the current through the grid leak resistor thereof and also the current through a portion of the cathode resistor are therefore almost exclusively supplied by positive and negative feedbacks, with only a very small portion thereof being supplied by the pickup. Consequently, there is practically no current through the pickup. The pickup appears to be looking into a relatively high resistance. To prevent the amplifier from becoming unstable by the positive feedback, the negative feedback is proportioned such that the resulting control effect of the feedback is equal to or advantageously slightly smaller than that of the input voltage. If equal, the amplifier would maintain itself in every state of input signal. After having applied a certain input signal voltage to the amplifier the latter would constantly produce a like input voltage via the positive and negative feedbacks even though the original voltage from the signal is removed. It is, therefore, more advantageous to proportion the control effect of the feedback voltages to be slightly smaller than that of the input voltage. Then, the output voltage of the amplifier will again drop to zero after the input signal voltage is removed.

If the total feedback is proportioned so that the amplifier maintains itself, the effect of the internal inpedance of the measuring value pickup is eliminated. However, as for the above described reasons such a proportioning is less desirable than when the feedback amplifier is allowed to take a small power from the pickup. Thus, the effective input resistance of the amplifier will not become infinite in practice, but it can be made extraordinarily great.

In a measuring value pickup having a substantial capacitive internal impedance it is expedient to proportion the feedback so that the limit frequency of the RC-combination, formed by the capacitive internal impedance and the resulting input resistance of the amplifier, is below the frequency range to be amplified, the limit frequency being defined as 1/RC.

In further modification of the invention the arrangement may be additionally provided such that for compensation of the frequency-dependent phase error caused by the capacitive internal impedance of the measuring value pickup a RC-combination connected like an integrating member is provided at the amplifier output, the limit frequency of which substantially conforms to the limit frequency of the combination of the measuring value pickup internal impedance and of the amplifier input resistance. With an amplifier laid out in such a manner signal voltages of piezoelectric force pickups or the like may be amplified in a practically distortion-free manner.

Amplifiers are known which include both a positive and a negative feedback. These involve completely different objects to be solved. As is well known such a negative feedback renders it possible to become substantially independent of specific properties of an amplifier. To this end, the output signal of the amplifier divided in a specific ratio is applied to a certain point in the circuit usually in the vicinity of the amplifier input in phase opposition to the normal signal at that point. Independence of the properties of the amplifier will be the more marked, the higher is the gain of the amplifier between said point in the circuit and the output thereof. To make the same as great as possible, a positive feedback has been provided in known arrangements. Usually, in the case of multistage amplifiers, the negative feedback is effected to the input of the first amplifier stage while the positive feedback is effected from the output of the amplifier to a point in the circuit subsequent, in the sense of the signal path, to the point of application of the negative feedback.

An embodiment of the invention is presented in the drawings and described as follows.

Although the following disclosure offered for public dissemination is detailed to ensure adequacy and said understanding, this is not intended to prejudice that purpose of a patent which is to cover each new inventive concept therein no matter how others may later disguise it by variations in form or additions or further improvements. The claims at the end hereof are intended as the chief aid towards this purpose; as it is these that meet the requirement of pointing out the parts, improvements, or combinations in which the inventive concepts are found.

Figure 1:
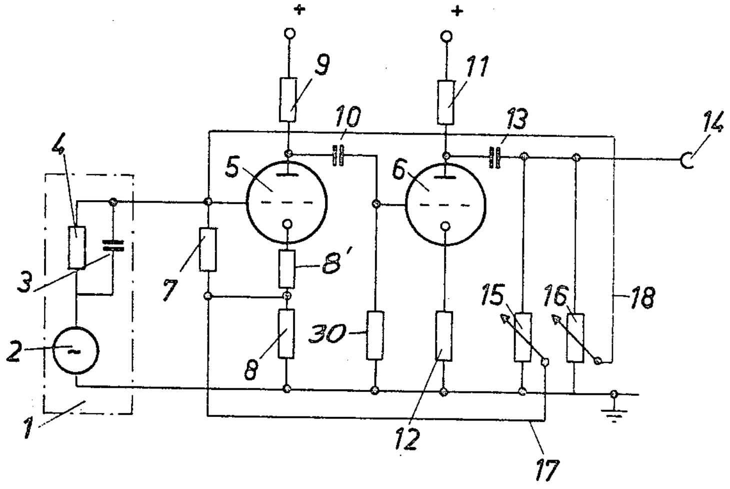
FIGURE 1 illustrates an amplifier embodying the present invention.

Referring now to FIGURE 1 reference numeral 1 designates a measuring value pickup. It represents a voltage source 2 in series with the parallel connection of a capacitance 3 and a resistor 4. Pickup 1 is connected to the input of a two-stage alternating current amplifier having two tubes 5 and 6. One pole of pickup 1 is connected to the grid (or control element) of input tube 5, and the other pole to ground. The grid leak resistor 7 of tube 5 is connected to the cathode (or emitter) thereof through resistor 8' and to ground via cathode resistor 8. Resistors 8 and 8' form a voltage divider and together form the primary current path from ground to cathode. Reference numeral 9 designates the load resistor of tube 5.

The anode (or collector) of tube 5 is connected to the grid of the second tube 6 through a coupling capacitor 10. Tube 6 has an anode resistor 11, a grid resistor 30 and a cathode resistor 12. The anode of tube 6 is connected to the output terminal 14 of the amplifier via a coupling capacitor 13. The output voltage relative to ground is picked off at the output terminal side of capacitor 13. The output terminal 14 has two potentiometers 15 and 16 connected thereto. At these two potentiometers (or variable voltage dividers) two adjustable feedback voltages are picked off. One voltage is applied to the cathode of tube 5 via a line 17 and resistor 8' and effects a negative feedback. The other voltage is applied to the grid of tube 5 via a line 18 and effects a positive feedback. The potentiometers 15 and 16 are adjusted such that the difference of the grid and cathode potentials is changed only slightly, however, the grid voltage follows the input signal. Thereby, the amplifier almost controls itself so that only very little power need be taken from the measuring value pickup 1. The resulting input resistance of the amplifier can be made very great so that the limit frequency $1/RC$ of the substantially capacitive internal reactance 3 and of the resulting input resistance of the amplifier (which is substantially greater than the sum of the resistors 7 and 8) is below the frequency range to be amplified.

Figure 2:
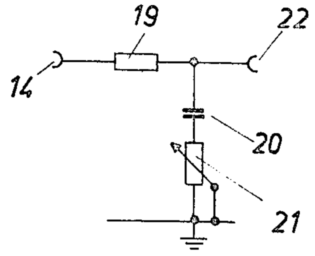
FIGURE 2 illustrates a phase correcting member connected to the output of the amplifier of FIGURE 1.

The phase error still occurring apart from an insignificant amplitude error may be compensated by a network in accordance with FIGURE 2. This network includes a large resistor 19 through which a capacitor 20 is charged. The capacitor 20 has an adjustable resistor 21 in series therewith. The output voltage of this network is picked off at terminal 22 between resistor 19 and capacitor 20. The circuit elements are proportioned so that the limit frequency of elements 20, 21 substantially conforms to the limit frequency of the combination of the capacitive measuring value pickup internal impedance and of the resulting amplifier input resistance. The occurring phase errors may be practically completely eliminated with such a proportioning. The resistor 21 serves the purpose of limiting the phase and amplitude correction of this network towards higher frequencies. With high frequencies the impedance of capacitor 20 becomes very small relative to resistor 21, and then the phase correcting member with increasing approximation is only a resistance voltage divider, without the output voltage dropping further with higher frequencies.

Figure 3:
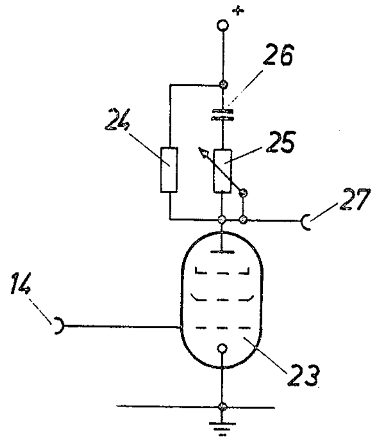
FIGURE 3 illustrates a modified form of the phase correcting member.

FIGURE 3 illustrates a modified form of the arrangement in FIGURE 2 wherein the amplitude decrease which occurs is balanced. Therein, terminal 14 is connected to the control grid of a pentode 23. The anode circuit of the pentode 23 has connected therein a resistor 24 as well as in parallel therewith, and in series connection with each other, a variable resistor 25 and a capacitor 26. A phase-corrected output voltage is picked off at the anode of pentode 23 by a terminal 27.

It is obvious that instead of the illustrated tube networks also similarly acting transistor networks may be used, if desired. The term "valve" is employed herein to include both vacuum tubes and transistors.

Figure 4:
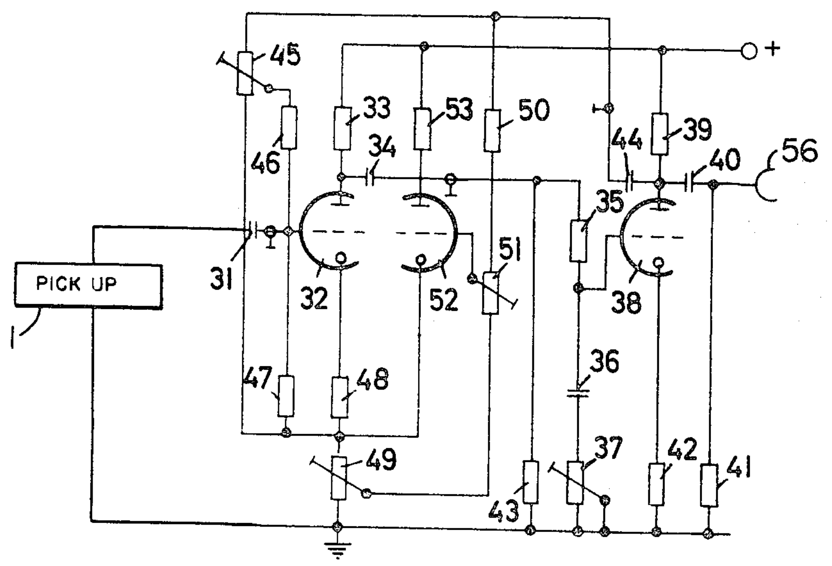
FIGURE 4 shows a more detailed wiring diagram of an enbodiment of the invention.

FIGURE 4 shows a specific embodiment of the invention. The input from pickup 1 (similar to that of FIG. 1 and not shown in detail in FIG. 4) is connected to the grid of a tube 32 through a capacitor 31. A voltage is tapped from the anode resistor 33 of the tube 32. This voltage is applied to the grid of a tube 38 through a capacitor 34 and an integrating network comprising the resistor 35, the capacitor 36 and an adjustable resistance 37. The output voltage is taken from the anode resistor 39 through a capacitor 40 and appears at terminal 56. Numeral 41 designates the output resistance of the amplifier, numeral 42 designates the cathode resistor of tube 38, and numeral 43 designates the output resistance of tube 32. The integrating network 35, 36, 37 corresponds to the circuit of FIG. 2 comprising resistors 19 and 21 and capacitor 20. The voltage taken from the resistor 39 at the amplifier output is, in addition fed back to the input circuit through a capacitor 44. For this purpose, a potentiometer 45 is provided from which a portion of the amplifier output voltage is tapped and is applied in phase with the input voltage through a resistor 46 to the grid of the tube 32 and the pickup. Numeral 47 designates the grid leak resistor. The cathode resistor of tube 32 is designated 48. The connection of the resistors 47 and 48, to which also one end of the potentiometer 45 is connected, is connected to ground through a resistor 49 designed as potentiometer.

A second feed back from the amplifier output is tapped from a voltage divider comprising a resistor 50 and a potentiometer 51. The end of the potentiometer 51 is connected to the slider of potentiometer 49. The slider of potentiometer 51 is connected to the grid of a tube 52.

The latter has an anode resistor 53. The cathode of the tube 52 is connected to the connection point of the resistors 47 and 48.

Comparing the circuit described hereinbefore with the simplified embodiment of FIG. 1 yields the following:

The potentiometer 45 of FIG. 4 corresponds, as to its function, to the potentiometer 16 of FIG. 1. Potentiometer 51 corresponds to the potentiometer 15. However, a tube 52 as an in-phase current amplifier is connected for decoupling purpose between the potentiometer 51 and the resistors 48, 49. The tube 32 corresponds to tube 5 and the tube 38 corresponds to tube 6. In the FIG. 4 the voltage for the amplifier output and for the feedback is taken off through separate capacitors 40 and 44, respectively, which as to their functions correspond to the capacitor 13 of FIG. 1.

A certain positive feed-back voltage is tapped from potentiometer 45 and is supplied to the pickup terminal (signal voltage source) through the resistor 46. Thereby the current drawn from the pickup is partly compensated. The positive feed-back voltage is, however, still insufficient for the present purpose. The voltage tapped from the potentiometer 51 is decoupled by the tube 52 and is supplied—in phase with the input voltage—to the common point of the resistors 47, 48 and 49. From this point a current flows through resistor 49 to ground. Another current flows through the resistor 47 and the capacitor 31 to the pickup. By the current through resistor 47, which then flows through the pickup, a voltage drop across resistor 47 is caused. This voltage drop results in that the grid does not completely follow the potential changes of the cathode but that the potential of the grid is raised a little less than the cathode. Consequently the result will be a negative feed-back. However, in spite of this, the current compensating effect of the positive feed-back from 45 will be supported.

This additional compensation even determines the negative feed-back character of the voltage from potentiometer 51. If the portion of the voltage tapped there from is increased, the current compensation is also increased, without excitation of self-sustained oscillations. With a larger current through resistor 47, the overall amplification is decreased due to the influence of the negative feed-back. Thereby also the positive feed-back voltage from the potentiometer 45 is decreased. Because of the large resistance 46 in the positive feed-back loop this is compensated to a great extent as, with higher voltage from 51, less current from 45 now flows through the pickup. As the result, however, it is to be noted, that a two high voltage from potentiometer 51 reduces the total compensation of the current drawn from the pickup. Thus, in order to achieve a sufficient degree of compensation, the slider of the potentiometer 51 has to be adjusted towards the resistor 49.

The capacitor 31 serves the purpose of keeping D.C. voltages away from the pickup.

The values of the elements of FIG. 4 are listed hereinbelow:

| Reference numeral: | | Value or type |
|---|---|---|
| 31 | μf | 1 |
| 32 | E80CC (6085) | ½ |
| 33 | kohm | 100 |
| 34 | μf | 8 |
| 35 | kohm | 470 |
| 36 | μf | 0.22 |
| 37 | kohm | 100 |
| 38 | E80CC (6085) | ½ |
| 39 | kohm | 100 |
| 40 | μf | 8 |
| 41 | mohm | 1 |
| 42 | kohm | 8.2 |
| 43 | mohm | 1 |
| 44 | μf | 8 |
| 45 | mohm | 1 |
| 46 | mohm | 10 |
| 47 | mohm | 1 |
| 48 | kohm | 8.2 |
| 49 | kohm | 10 |
| 50 | mohm | 1 |
| 51 | mohm | 1 |
| 52 | E80CC (6085) | ½ |
| 53 | kohm | 10 |

We claim:

1. In an amplifier for use with a measuring value pickup having a large internal impedance, said amplifier including an input adapted to be connected to said pickup to receive an input signal from said pickup, an output, and a point in the signal path between the input and output at which point an amplified version of the input signal appears in phase with the input signal, said amplifier having an input valve with an emitter, a control element and a collector, the improvement comprising: a first voltage divider means connected to said point and to said control element to provide a positive voltage feedback to said control element as a function of the signal at said point and to said emitter to provide a negative voltage feedback to said control element as a function of the signal at said point, said positive feedback being no greater than said negative feedback; said voltage divider means comprising a divided resistor in the circuit of said emitter and a second resistor between the control element and the division in the divided resistor, said connection from the voltage divider means to provide the negative feedback being made at the junction of said division and the second resistor.

2. In an amplifier as set forth in claim 1 for use with a measuring value pickup having a capacitive internal impedance of approximately a given amount, wherein the positive and negative feedback voltages are proportioned to provide an input resistance to said amplifier such that the limit frequency of the resistance-capacitance combination formed by said input resistance and said impedance is below the frequency range of the force to be measured.

3. In an apparatus as set forth in claim 2 including a filtering means connected to the output stage of the amplifier, said filtering means having a limit frequency substantially in conformity with the limit frequency of said resistance-capacitance combination.

4. In an apparatus as set forth in claim 3, wherein said filtering means comprises a resistance-capacitance combination connected like an integrating member.

5. In an apparatus as set forth in claim 4, wherein said filtering means comprises a valve having an input connected to the amplifier output and a load resistor, and said resistance-capacitance combination is connected in parallel with said load resistor.

6. In an apparatus as set forth in claim 5, wherein said valve of the filtering means is a pentode and the load resistor is in the anode circuit of the pentode and has a relatively large resistance value.

7. In an amplifier for use with a measuring value pickup having a large internal impedance, said amplifier including an input adapted to be connected to said pickup to receive an input signal from said pickup, an output, and a point in the signal path between the input and output at which point an amplified version of the input signal appears in phase with the input signal, said amplifier having an input valve with an emitter element, a control element and a collector, the improvement comprising: a first voltage divider means connected to said point and to one of said elements to provide a positive voltage feedback to said input valve as a function of the signal at said point; and a second voltage divider means connected to said point and to one of said elements to provide a negative voltage feedback to said input valve as a function of the signal at said point, said positive feedback being no greater than said negative feedback; said first voltage divider means being connected from said point to said control element; said amplifier having a divided resistor in the circuit of said emitter element and a second resistor between the control element and the division in the divided resistor, said connection from the second voltage divider means to provide the negative feedback being made at the junction of said division and the second resistor.

References Cited

UNITED STATES PATENTS

| | | | |
|---|---|---|---|
| 2,439,245 | 4/1948 | Dunn | 330—93 X |
| 2,613,071 | 10/1952 | Hansel | 73—503 X |
| 2,752,432 | 6/1956 | Richter | 330—104 X |
| 2,929,027 | 3/1960 | Cooke | 330—104 X |
| 3,014,374 | 12/1961 | Johnston | 73—503 X |
| 3,267,386 | 8/1966 | Davis et al. | 330—28 X |

ARTHUR GAUSS, *Primary Examiner.*

J. D. FREW, *Assistant Examiner.*